(12) United States Patent
Ryu et al.

(10) Patent No.: US 9,335,821 B2
(45) Date of Patent: May 10, 2016

(54) METHOD AND DEVICE FOR CONTROLLING HAPTIC INTERFACE

(75) Inventors: Je Ha Ryu, Gwangju (KR); Jong Phil Kim, Seoul (KR); Sang Yun Baek, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 219 days.

(21) Appl. No.: 13/475,061

(22) Filed: May 18, 2012

(65) Prior Publication Data

US 2013/0088440 A1    Apr. 11, 2013

(30) Foreign Application Priority Data

Oct. 10, 2011    (KR) .................. 10-2011-0103113

(51) Int. Cl.
*G06F 3/041*    (2006.01)
*G06F 3/01*    (2006.01)

(52) U.S. Cl.
CPC ..................... *G06F 3/016* (2013.01)

(58) Field of Classification Search
CPC .......... G06F 3/016; G06F 3/041; G06F 3/017
USPC .................. 345/156, 158, 173, 633
See application file for complete search history.

(56) References Cited

U.S. PATENT DOCUMENTS

| 6,061,004 A * | 5/2000 | Rosenberg ...................... 341/20 |
| 6,337,678 B1 * | 1/2002 | Fish ............................... 345/156 |
| 6,353,850 B1 * | 3/2002 | Wies et al. ..................... 709/203 |
| 7,283,123 B2 * | 10/2007 | Braun et al. ................... 345/163 |
| 2002/0062177 A1 * | 5/2002 | Hannaford ............. B25J 9/1689 700/245 |
| 2005/0231480 A1 * | 10/2005 | Kim et al. ...................... 345/163 |
| 2006/0142657 A1 * | 6/2006 | Quaid ................ A61B 17/1764 600/424 |
| 2006/0187197 A1 * | 8/2006 | Peshkin et al. ................ 345/156 |

OTHER PUBLICATIONS

Kim, Jong-Phil; Baek, Sang-yun; Ryu, Jeha; "A Force Bounding Approach for Stable Haptic Interaction"; The Korean Society of Mechanical Engineers; published in Korea on May 20, 2011.

* cited by examiner

*Primary Examiner* — Calvin C Ma
(74) *Attorney, Agent, or Firm* — Nath, Goldberg & Meyer; Joshua B. Goldberg

(57) ABSTRACT

The present disclosure provides a method and device for controlling a haptic interface, which can maintain stability and enhance transparency by restricting force caused by unnecessary energy generated in the sample and hold processes while controlling the haptic interface. The method includes detecting a physical parameter based on driving of the haptic interface; calculating a reaction to be sent from a virtual environment to the haptic interface according to the physical parameter; calculating a bounding parameter satisfying a condition that a haptic system is passive, using the physical parameter and the reaction; adjusting the bounding parameter to be within a preset range; calculating force to be output to the haptic interface according to the adjusted bounding parameter; and applying the calculated force to the haptic interface.

8 Claims, 2 Drawing Sheets

METHOD AND DEVICE FOR CONTROLLING HAPTIC INTERFACE

CROSS-REFERENCE TO RELATED APPLICATION

This application claims the benefit under 35 U.S.A. §119 of Korean Patent Application No. 10-2011-0103113, filed on Oct. 10, 2011 in the Korean Intellectual Property Office, the entirety of which is incorporated herein by reference.

BACKGROUND

1. Technical Field

The present invention relates to a method and device for controlling a haptic interface. More particularly, the present invention relates to a method and device for controlling a haptic interface, which may maintain stability and enhance transparency by limiting force under conditions that energy generated in the haptic interface, a sample-and-hold unit, a controller and a virtual environment satisfy passivity conditions.

2. Description of the Related Art

Greater operational interactivity has become possible with the development of computer graphics technology, and interest in virtual environment technology has increased as graphics hardware becomes cheaper, and thus there have been realized a number of virtual environment systems available for various fields such as entertainment, military training, surgery training, education, biomedical simulation, engineering design, simulation, etc. In the virtual environment technology, haptic technology is one of research fields indispensable to maximize reality through a realistic virtual environment in which a user can further immerse themselves. Through various haptic interfaces, a user can feel tickling sensation and tactile sensation and interact with the virtual environment.

In order to provide correct force and torque information to a user through haptic simulation, stability is one very important factor in the field of haptic research. As research on such a stable haptic interactive system, Colgate and Schenkel have proposed a virtual coupling algorithm having virtual connection between a virtual environment and a haptic interface for stable haptic display (J. E. Colgate and G. G. Schenkel, "Passivity of a class of sampled-data systems: Application to haptic interfaces," J. Robot. Syst., vol. 14, no. 1, pp. 37-47. (1997)).

Meanwhile, Hannaford and Ryu have proposed a time domain passivity theorem (B. Hannaford, and Jee-hwan Ryu, "Time Domain Passivity Control of Haptic Interfaces," IEEE Trans. On Robotics and Automation, vol. 18, pp. 1-10. (2002)). Through a passivity observer/passivity controller (PO/PC) under a short sampling cycle, the time domain passivity theorem observes energy input and output in real time and consumes total energy to stabilize the system at every sampling time.

Also, Ryu et al. have proposed a new PO capable of estimating energy generated in a zero-order holder when the sampling period is long (Jee-hwan Ryu, Y. S. Kim and B. Hannaford, "Sampled and Continuous Time Passivity Control," Proc. IEEE Int. Conf. On Robot and Automation, Taipei, Taiwan. (2003)). Further, they have proposed a reference energy following method where a real energy input follows reference energy varied in time so as to prevent a haptic device from trembling at high frequencies due to sudden change in force (Jee-hwan Ryu, B. Hannaford, C. Preusche, and G. Hirzinger, "Time Domain Passivity Control with Reference Energy Behavior," Proc. IEEE/RSJ Int. Conf. on Intelligent Robotics and Systems, Las Vegas, USA. (2003)). Preusche et al. have extended the time domain passivity theorem to multiple degrees of freedom, which has an advantage in that there is no need to know a correct kinetic model of the haptic interface (C. Preusche, G. Hirzinger, J. H. Ryu and B. Hannaford, "Time Domain Passivity Control for 6 Degrees of Freedom Haptic Displays," Proc. IEEE/RSJ Int. Conf. on Intelligent Robotics and Systems, Las Vegas, USA. (2003)).

In the meantime, Kim and Ryu have proposed an energy bounding algorithm as a conventional method of stabilizing a haptic interface (J. P. Kim and Jeha Ryu, "Stable Haptic Interaction Control Using Energy Bounding Algorithm," IEEE/RSJ Int. Conf. Intelligent Robots and Systems (IROS2004), Gyeongju, Korea. (2004)). This algorithm can efficiently consume the energy generated in the zero-order holder even when the sampling period is long. The energy bounding algorithm limits the energy generated in the zero-order holder within a range of energy consumable by a physical damping value of the haptic interface, thereby satisfying passivity conditions.

However, such a haptic interface device used in haptic interaction does not generate energy, but a sample-and-hold unit and a control system generate energy, causing instability of the whole system. Moreover, conventional technologies have numerous design restrictions in stabilizing the haptic system, and deteriorate reality in an adjustment process for stabilization.

BRIEF SUMMARY

Therefore, the present invention is aimed at providing a method and device for controlling a haptic interface, which is more realistic and simple and has enhanced transparency of a haptic system while maintaining stability, when interacting with a virtual object in a predetermined realistic and virtual environment.

In accordance with an aspect of the present invention, a method of controlling a haptic interface includes: detecting a physical parameter based on driving of the haptic interface; calculating a reaction to be sent from a virtual environment to the haptic interface according to the physical parameter; calculating a bounding parameter satisfying a to condition that a haptic system is passive, using the physical parameter and the reaction; adjusting the bounding parameter to within a preset range; calculating force to be output to the haptic interface according to the adjusted bounding parameter; and applying the calculated force to the haptic interface.

The bounding parameter may include information about force calculated using the physical parameter and the reaction, and the adjusting the bounding parameter comprises adjusting the bounding parameter to a preset maximum value when the bounding parameter is greater than or equal to the preset maximum value; adjusting the bounding parameter to a preset minimum value when the bounding parameter is less than or equal to the preset minimum value; and maintaining the bounding parameter when the bounding parameter is between the preset maximum value and the preset minimum value.

The force calculated and applied to the haptic interface may include information about force based on the adjusted bounding parameter.

In accordance with another aspect of the present invention, there is provided a device for controlling force to be transferred to a haptic interface between the haptic interface and a virtual environment of a haptic system. The device includes:

a sample-and-hold unit that performs input/output of the haptic interface and allows an analog signal and a digital signal to be interconverted; and a controller that receives a physical parameter of the haptic interface through the sample-and-hold unit, calculates force to be transferred to the haptic interface according to interaction with the virtual environment, and transfers the calculated force to the haptic interface through the haptic interface, the controller calculating the force to be output to the haptic interface by calculating a reaction to be sent from the virtual environment to the haptic interface according to the physical parameter, calculating a bounding parameter satisfying a condition that a haptic system is passive, using the physical parameter and the reaction, and adjusting the bounding parameter to within a preset range.

The bounding parameter may include information about force calculated using the physical parameter and the reaction, and the bounding parameter may be adjusted to a preset maximum value when the bounding parameter is greater than or equal to the preset maximum value; the bounding parameter may be adjusted to a preset minimum value when the bounding parameter is less than or equal to the preset minimum value; and the bounding parameter may be maintained when the bounding parameter is between the preset maximum value and the preset minimum value.

The force applied to the haptic interface may include information about force based on the adjusted bounding parameter.

As such, according to embodiments of the present invention, a haptic interface is more realistic and simpler and enhances transparency of a haptic system while maintaining stability, when interacting with a virtual object in a predetermined realistic and virtual environment.

BRIEF DESCRIPTION OF THE DRAWINGS

The above and other aspects, features, and advantages of the invention will become apparent from the detailed description of the following embodiments in conjunction with the accompanying drawings, in which.

DETAILED DESCRIPTION

Haptic System

Figure 1:
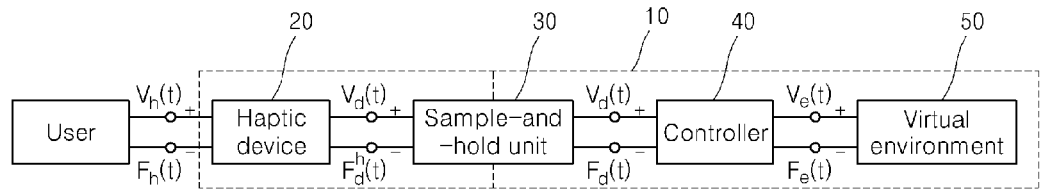
FIG. 1 is a block diagram of a general haptic system.

FIG. 1 is a block diagram of a general haptic system.

Referring to FIG. 1, the haptic system 10 includes a haptic interface 20, a sample-and-hold unit 30, a controller 40, and a virtual environment 50.

The haptic interface 20 corresponds to a control pad to be directly controlled by a user, and serves to transfer a stimulus from the virtual environment 50 to a user.

The sample-and-hold unit 30 converts a continuous analog signal, which is output from the haptic interface 20 acting as an input/output device, to a digital signal and provides the converted digital signal to the controller 40. Further, the sample-and-hold unit 30 converts a digital signal, which is output as a discrete signal from the controller 40, to an analog signal and provides the converted analog signal to the haptic interface 20.

A control system includes the controller 40 and the virtual environment 50. Typically, the control system is achieved by a computer and application programs. Here, the application program is established to realize a virtual environment through the computer.

In the haptic system 10, interaction between a user and the virtual environment 50 executed by the controller 40 is achieved through the haptic interface 20. That is, a stimulus to be sent from the virtual environment 50 in response to user control of the haptic interface 20 is transferred from the control system to a user through the haptic interface 20.

However, the haptic system 10 may generate undesired energy due to various factors, for example, information loss generated when the sample-and-hold unit 30 performs sampling for converting information between a continuous system and a discrete system, time delay due to holding, numerical operation performed by the control system 40 and 50, and the like. However, such undesired energy generated in the haptic system 10 may generate unstable movement through the haptic interface 20 and harm a user. Therefore, the energy transferred from the control system to the haptic interface 20 must be properly controlled so as to secure user safety, and unnecessary energy causing unstable movement must be eliminated.

However, since user movement includes various uncertainties, it is difficult to obtain exact modeling of the user movement. Further, since energy is essentially generated while the sample-and-hold unit 30 performs sample and hold operations and the virtual environment 50 is generally configured with a nonlinear system, it is very difficult to find a method for stabilizing the haptic system 10.

As a conventional method for stabilizing a haptic system, a passivity theorem has been proposed. Passivity is an abstract expression relating to energy consumption and is used to treat a stabilization problem regulated in linear and nonlinear systems in light of input and output. The system satisfying a passivity condition cannot generate energy by itself and guarantees stable operations. Such a passivity theorem provides great advantages in solving a stability problem in robotics, teleoperation systems and haptic systems, in which various systems are cooperatively connected.

Figure 2:
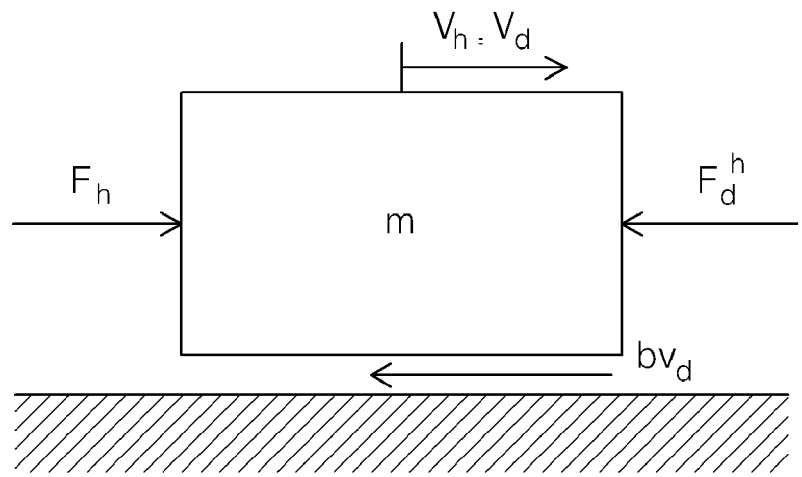
FIG. 2 is a schematic view of a haptic interface model having one degree of freedom.

FIG. 2 is a schematic view of a haptic interface model having one degree of freedom.

According to the passivity theorem, assuming a user is the passivity at an interest frequency in the haptic system 10 as shown in FIG. 1, the stabilization problem is focused on the passivity of other combinational elements and it can be represented by the following Expression 1.

$$\int_0^t F_h(\tau)v_h(\tau)d\tau + \epsilon_0 \geq 0, t \geq 0 \qquad \text{<Expression 1>}$$

where $F_h(\tau)v_h(\tau)$ is a variable related to a user's continuous operation and progress, and $\epsilon_0$ is an initial energy of the haptic system 10. If the haptic system 10 satisfies the passivity condition represented by Expression 1, the haptic system 10 consumes energy and the sum of energy flow-in of each of the haptic interface 20, the sample-and-hold unit 30, the controller 40 and the virtual environment 50 never becomes a negative value. Energy variation during $0 \leq t < nT$ can be represented by Expression 2.

$$E(n) = \int_0^{nt} m\dot{v}_d(t)v_d(t)dt + \int_0^{nt} bv_d^2(t)dt + \int_0^{nt} F_d^h(t)v_d(t)dt \geq 0 \qquad \text{<Expression 2>}$$

In Expression 2, m and b are mass and damping values of the haptic interface 20, and $F_d^h(k)$ and $v_d(k)$ are force and velocity generated in the haptic interface 20. The first part of Expression 2 indicates inertia and has a limited non-negative value in movement at a limited velocity.

$$\int_0^{nT} m\dot{v}_d(t)v_d(t)\,dt = \frac{1}{2}mv_d^2(n) \geq 0 \qquad \langle \text{Expression 3} \rangle$$

The second part of Expression 2 is a viscous damper that refers to energy loss, which can be represented by Cauchy-Schwarz inequality.

$$\int_0^{nT} bv_d^2(t)\,dt = \sum_{k=0}^{n-1} b \int_{kT}^{(k+1)T} v_d^2(t)\,dt \qquad \langle \text{Expression 4} \rangle$$

$$\geq \sum_{k=0}^{n-1} \frac{b}{T}\left[\int_{kT}^{(k+1)T} v_d(t)\,dt\right]^2$$

$$= \sum_{k=0}^{n-1} B\Delta x_d^2(k+1)$$

In Expression 4, $$B = \frac{b}{T},$$

and $\Delta x_d(k+1) = [x_d(k+1) - x_d(k)]$. B represents energy loss ability between samples. The last part of Expression 2 indicates that energy flows in the sample-and-hold unit 30, the controller 40 and the virtual environment 50. When a holder is in a zero-order hold, this can be represented as in Expression 5.

$$\int_0^{nT} F_d^h(t)v_d(t)\,dt = \sum_{k=0}^{n-1}\left\{\int_{kT}^{(k+1)T} F_d^h(t)v_d(t)\,dt\right\} \qquad \langle \text{Expression 5} \rangle$$

$$= \sum_{k=0}^{n-1}\left\{F_d(k)\int_{kT}^{(k+1)T} v_d(t)\,dt\right\}$$

$$= \sum_{k=0}^{n-1}\{F_d(k)\Delta x_d(k+1)\}$$

The first condition of the passivity in Expression 2 increases due to quick variation of acceleration in an initial stage of driving the haptic interface 20, but the second and third conditions of the passivity are dominant as time passes. Therefore, the passivity condition of the haptic system 10 during $0 \leq t \leq nT$ may be written as follows, and the passivity condition provided by Expression 6 always has a positive value.

$$E(n) \geq E_1(n) = \qquad \langle \text{Expression 6} \rangle$$

$$\sum_{k=0}^{n-1} B\Delta x_d^2(k+1) + \sum_{k=0}^{n-1}\{F_d(k)\Delta x_d(k+1)\} \geq 0$$

Unstable behavior of the haptic system 10 is caused by unnecessary energy generated in the sample-and-hold unit 30, the controller 40 including a haptic rendering algorithm and a control algorithm, and the virtual environment 50, which constitute the haptic system 10. For example, explicit numerical integration involved in the haptic rendering algorithm, a filter and a gravity compensator involved in the control algorithm, and the like are widely known as factors generating such energy. Also, energy generated by a phase lag essentially involved in the sample-and-hold unit 30 is recognized as a structural problem of the haptic system 10. However, since a conventional virtual coupling method cannot compensate for energy generated in the virtual environment 50, it is necessary for the virtual environment 50 to satisfy the passivity condition. Further, since the conventional time domain passivity algorithm cannot compensate for energy generated by the sample-and-hold unit 30, the energy generated by the phase lag must be minimized through very quick sampling.

As such, it will be appreciated that the haptic interface 2 does not generate energy, but the sample-and-hold unit 30 and the control system 40, 50 generate energy.

<Improved Haptic System>

Figure 3:
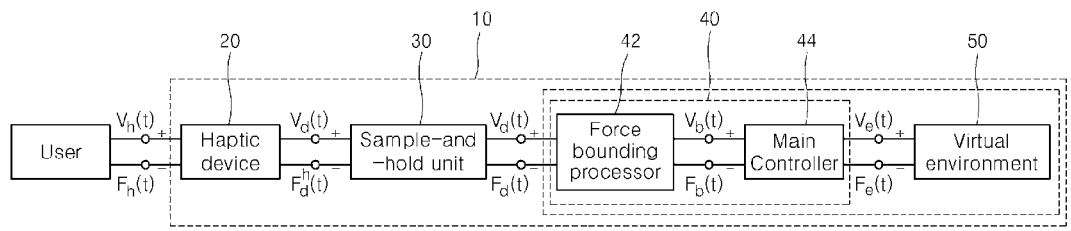
FIG. 3 is a block diagram of a haptic system in accordance with one exemplary embodiment of the present invention.

FIG. 3 is a block diagram of a haptic system in accordance with one exemplary embodiment of the present invention.

The haptic system 10 according to the exemplary embodiment includes a haptic interface 20, a sample-and-hold unit 30, a controller 40, and a virtual environment 50, in which the controller 40 includes a force bounding processor 42 and a main controller 44.

The haptic interface 20, the sample-and-hold unit 30, and a virtual environment 50 have the same configurations as described with reference to FIGS. 1 and 2.

The force bounding processor 42 serves to process force to be transferred from the virtual environment 50 to the haptic interface 10, and transfer the force to the haptic interface 10 via the sample-and-hold unit 30. The force bounding processor 42 makes the control system including the main controller 44 and the virtual environment 50 passive, and restricts energy transferred from the sample-and-hold unit 30 to the haptic interface 20 so as to be fully consumed by energy consuming elements of the haptic interface 20.

The main controller 44 may include a movement calculator for calculating forward motion dynamics, backward motion dynamics, Jacobian and inverse kinematics, and a gravity and friction compensation program.

With the force bounding processor 42, a method of controlling force to be transferred to the haptic interface 20 will be described below.

Figure 4:
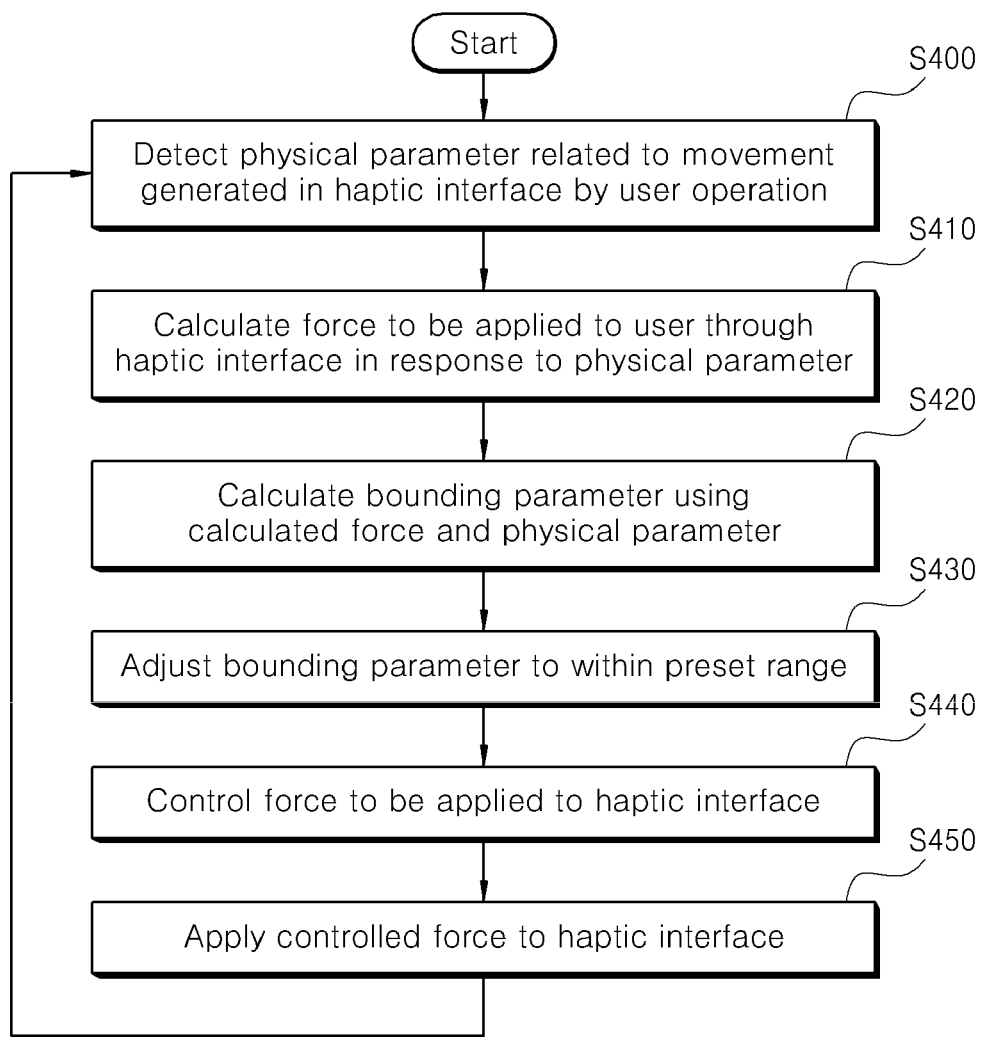
FIG. 4 is a flowchart of a haptic control method in accordance with one exemplary embodiment of the present invention.

FIG. 4 is a flowchart of a haptic control method in accordance with one exemplary embodiment of the present invention.

First, if the haptic interface 20 is operated by a user, physical parameters relating to motion when a drive unit of the haptic interface 20 is driven by user operation are detected (S400). To this end, an initialization stage is set by 'damping value(K)=0', 'force caused by damping(Fd(K))=0'. In addition, operation S400 is performed at each time interval set after the initialization stage. Here, the detected physical parameters may include a position (xd(k)) or velocity (vd(k)) of the drive unit in the haptic interface 20. The physical parameter may be detected using a sensor provided to the haptic interface 20 (for example, an encoder in the haptic interface 10) that detects the position and motion of the driving unit of the haptic interface 20.

Next, using the physical parameter, a position value and a velocity value of a position of an operating point in the virtual environment 50 corresponding to a position of an operating point in a real drive unit of the haptic interface 20 are established, and thus force (Fe(k)) to be applied to a user through the haptic interface 20 in the virtual environment 50 is calculated (S410). This process may be achieved by determining whether the operating point in the virtual environment corresponding to the operating point in the haptic interface 20 collides with a virtual object in the virtual environment 50, followed by calculating a reaction generated by the collision.

Using the force calculated in operation S410 and the physical parameter calculated in operation S400, a bounding parameter is calculated (S420). The bounding parameter is obtained using a necessary and sufficient condition and a sufficient condition of the passivity condition that the haptic system may be passive.

If the first necessary and sufficient condition of the passivity condition is used, some energy ($E_1(k)=B\Delta x_d^2(k)+F_d(k-1)\Delta x_d(k)+E(k-1)$) generated in the haptic system is used to calculate the bounding parameter (Fd(K)). In this case, a range of the bounding parameter may be established by Expression 7.

$$F_d^2(k) \leq 4BE_1(k) \qquad \langle \text{Expression 7} \rangle$$

If the sufficient condition of the passivity condition is used, some energy1 ($E_2(k)=\beta(k-1)\Delta x_d^2(k)+F_d(k-1)\Delta x_d(k)+E_2(k-1)$) generated in the haptic system is used to calculate the bounding parameter (Fd(K)). In this case, a range of the bounding parameter may be established by Expression 8.

$$F_d^2(k) \leq \frac{\beta(k)}{\beta(k-1)}\{F_d(k-1)+2\beta\Delta x_d(k)\}^2 \qquad \langle \text{Expression 8} \rangle$$

At this time, if the calculated force (Fe(k)) is not 0, $0<\beta(k)\leq B$, and $$\beta(k) = \frac{\beta(k-1)F_e^2(k)}{\{F_d(k-1)+2\beta(k-1)\Delta x_d(k)\}}.$$

Next, it is determined whether the calculated bounding parameter (Fd(K)) is within a preset range, and if the bonding parameter is not within the preset range, the bounding parameter is controlled (S430).

If the bounding parameter (Fd(k)) is greater than or equal to a preset maximum value (Fdmax(k)), Fd(k) is adjusted to Fdmax(k). If the bounding parameter Fd(k) is less than or equal to a preset minimum value (Fdmin(k)), Fd(k) is adjusted to Fdmin(k). If the bounding parameter (Fd(k)) is between the maximum value and the minimum value, the bounding parameter is directly applied.

Next, using the controlled bounding parameter, force to be applied to the haptic interface 20 is controlled (S440).

It is determined whether the controlled bounding force (Fe(k)) is within a preset bounding range. If it is determined that the bounding parameter (Fd(k)) is within the preset bounding range, the force to be applied to the drive elements of the haptic interface is calculated using the calculated bounding parameter.

If it is determined that the bounding parameter (Fd(k)) is not within the preset bounding range, it is determined whether the bounding parameter is greater than or equal to the preset maximum value (Fdmax(k)). If it is determined that the bounding parameter (Fd(k)) is greater than or equal to the preset maximum value, the force to be applied to the drive elements of the haptic interface 20 is calculated using the bounding parameter of the preset maximum value. On the other hand, if it is determined that the bounding parameter (Fd(k)) is less than or equal to the preset minimum value, the force to be applied to the drive elements of the haptic interface 20 is calculated using the bounding parameter of the preset minimum value.

Such calculation of the force to be applied to the haptic interface 20 may be achieved by the force bounding processor 42.

Last, the finally controlled force is applied to the drive unit of the haptic interface 20 (S450).

The foregoing operations S400 to S450 may be repeated at each time interval.

Although some embodiments have been described herein, it should be understood by those skilled in the art that these embodiments are given by way of illustration only, and that various modifications, variations, and alterations can be made without departing from the spirit and scope of the invention. Therefore, the embodiments and the accompanying drawings should not be construed to limit the technical spirit of the present invention, but should be construed to illustrate the technical spirit of the present invention. The scope of the invention should be interpreted according to the following appended claims and to cover all modifications or variations induced from the appended claims and equivalents thereof.

What is claimed is:

1. A method of controlling a haptic interface, comprising:
   detecting a physical parameter based on driving of the haptic interface;
   calculating a reaction to be sent from a virtual environment to the haptic interface according to the physical parameter;
   calculating a bounding parameter satisfying a passivity condition that a haptic system is passive, using the physical parameter and the reaction, wherein the bounding parameter obtained by using a necessary and sufficient condition and a sufficient condition of the passivity condition;
   adjusting the bounding parameter to within a preset range, wherein the bounding parameter comprises information about force calculated using the physical parameter and the reaction, and the adjusting the bounding parameter comprises adjusting the bounding parameter to a preset maximum value when the bounding parameter is greater than or equal to the preset maximum value; adjusting the bounding parameter to a preset minimum value when the bounding parameter is less than or equal to the preset minimum value; and maintaining the bounding parameter when the bounding parameter is between the preset maximum value and the preset minimum value;
   calculating force to be output to the haptic interface according to the adjusted bounding parameter; and
   applying the calculated force to the haptic interface.

2. The method according to claim 1, wherein the force calculated and applied to the haptic interface comprises information about force based on the adjusted bounding parameter.

3. The method according to claim 1, when the necessary and sufficient condition of the passivity condition is used to obtain the bounding parameter in the step of calculating a bounding parameter, the bounding parameter is obtained by using an energy generated in the haptic system, and the energy is defined as $$E_1(k)=B\Delta x_d^2(k)+F_d(k-1)\Delta x_d(k)+E(k-1).$$

4. The method according to claim 3, wherein a range of the bounding parameter is defined as $$F_d^2(k) 4BE_1(k).$$

5. The method according to claim 1, when the sufficient condition of the passivity condition is used to obtain the bounding parameter in the step of calculating a bounding parameter, the bounding parameter is obtained by using an energy generated in the haptic system, and the energy is defined as $$E_2(k)=\beta(k-1)\Delta x_d^2(k)+F_d(k-1)\Delta x_d(k)+E_2(k-1).$$

6. The method according to claim 5, wherein a range of the bounding parameter is defined as $$F_d^2(k) \le \frac{\beta(k)}{\beta(k-1)}\{F_d(k-1) + 2\beta\Delta x_d(k)\}^2.$$

7. A device for controlling force to be transferred to a haptic interface between the haptic interface and a virtual environment of a haptic system, comprising:
   a sample-and-hold unit that performs input/output of the haptic interface and allows an analog signal and a digital signal to be interconverted; and
   a controller that receives a physical parameter of the haptic interface through the sample-and-hold unit, calculates force to be transferred to the haptic interface according to interaction with the virtual environment, and transfers the calculated force to the haptic interface through the haptic interface,
   the controller calculating the force to be output to the haptic interface by calculating a reaction to be sent from the virtual environment to the haptic interface according to the physical parameter, calculating a bounding parameter satisfying a passivity condition that a haptic system is passive, using the physical parameter and the reaction, wherein the bounding parameter obtained by using a necessary and sufficient condition and a sufficient condition of the passivity condition, and adjusting the bounding parameter to within a preset range, wherein the bounding parameter comprises information about force calculated using the physical parameter and the reaction, and the bounding parameter is adjusted to a preset maximum value when the bounding parameter is greater than or equal to the preset maximum value; the bounding parameter is adjusted to a preset minimum value when the bounding parameter is less than or equal to the preset minimum value; and the bounding parameter is maintained when the bounding parameter is between the preset maximum value and the preset minimum value.

8. The device according to claim 7, wherein the force applied to the haptic interface comprises information about force based on the adjusted bounding parameter.

* * * * *